United States Patent [19]

Nishino et al.

[11] 4,105,513
[45] Aug. 8, 1978

[54] SOLID ELECTROLYTE CAPACITOR HAVING METALLIC CATHODE COLLECTOR IN DIRECT CONTACT WITH MANGANESE DIOXIDE ELECTROLYTE AND METHOD OF PRODUCING SAME

[75] Inventors: Atsushi Nishino; Hayashi Hayakawa; Akihiko Yoshida; Junichiro Umeda, all of Kadoma, Japan

[73] Assignee: Matsushita Electric Industrial Co., Limited, Japan

[21] Appl. No.: 738,574

[22] Filed: Nov. 3, 1976

[30] Foreign Application Priority Data

Nov. 8, 1975 [JP] Japan ................................ 50-13427

[51] Int. Cl.$^2$ .................... C25D 11/34; H01G 9/02
[52] U.S. Cl. .................... 204/38 A; 427/80; 427/226; 427/419 B; 428/469; 428/539; 29/570; 361/322
[58] Field of Search ............... 204/38 A; 427/80, 226, 427/419 B; 428/469, 539; 29/570; 361/433, 322

[56] References Cited

U.S. PATENT DOCUMENTS

| 3,375,413 | 3/1968 | Brill ........................................ 29/570 |
| 3,432,918 | 3/1969 | Riley et al. ............................ 361/433 |
| 3,621,342 | 11/1971 | Yoshimura et al. .................... 29/570 |
| 4,038,159 | 7/1977 | Nishino et al. ..................... 204/38 A |
| 4,042,420 | 8/1977 | Nishino et al. ......................... 29/570 |

Primary Examiner—John H. Mack
Assistant Examiner—William T. Leader
Attorney, Agent, or Firm—Robert E. Burns; Emmanuel J. Lobato; Bruce L. Adams

[57] ABSTRACT

In a solid electrolyte capacitor, a metallic cathode collector layer is in direct contact with an electrolyte layer which is formed of densely accumulated manganese dioxide particles of 0.1 – 50 μm. The manganese dioxide layer is formed by performing pyrolysis of manganese nitrate in a semi-closed heating chamber of a radiant furnace to offer a resistance to the outflow from the chamber of gaseous decomposition products. The collector layer is formed by spraying, preferably by plasma spraying, of a metal powder typified by copper powder.

16 Claims, 7 Drawing Figures

10 μm

10 μm

SOLID ELECTROLYTE CAPACITOR HAVING METALLIC CATHODE COLLECTOR IN DIRECT CONTACT WITH MANGANESE DIOXIDE ELECTROLYTE AND METHOD OF PRODUCING SAME

BACKGROUND OF THE DISCLOSURE

This invention relates to a solid electrolyte capacitor having a metallic cathode collector layer in direct contact with a manganese dioxide electrolyte layer and a method of producing the same.

A solid electrolyte capacitor of a well known type employs a valve metal typified by aluminum and tantalum as the material of the anode and manganese dioxide as the solid electrolyte. The anode takes the form of a porous mass or body obtained by pressing and sintering a valve metal powder. A dielectric layer is formed on the surface of the anode body by a well known anodic oxidation technique using an acid solution as an electrolyte. A solid electrolyte layer is formed on the dielectric oxide layer by immersing the anode body in an aqueous solution of manganese nitrate and heating the wet anode body to cause pyrolytic decomposition of manganese nitrate to manganese dioxide. The immersion and heating are repeated several times until a satisfactorily dense and stable manganese dioxide layer is formed. Then a contact layer is formed on the solid electrolyte layer by the application of, for example, colloidal graphite in the form of an aqueous dispersion, followed by drying. A metallic cathode collector layer is formed on the contact layer by the application of conductive paste containing dispersed therein fine particles of, for example, silver.

The manganese dioxide layer formed by the pyrolysis of a manganese nitrate solution is a spongy one and, when microscopically observed, has an uneven and irregularly rugged surface. Accordingly it is practically impossible to form a cathode collector layer directly on the manganese dioxide layer with a sufficiently low electrical resistance. The provision of the graphite contact layer between the manganese dioxide layer and the cathode collector layer is for the purpose of solving this problem. However, the contact layer itself is not easy to form satisfactorily. To realize a full impregnation of the irregularly rugged surface region of the manganese dioxide layer with graphite, it is necessary to use a uniform dispersion of extremely fine, for example smaller than 1 $\mu$m, graphite particles such as "AQUA-DAG" (trademark of Acheson Colloid Co.) which is an ammoniacal aqueous dispersion of colloidal graphite. Such a graphite dispersion is diluted to a suitable concentration to immerse the anode body therein. The contact graphite layer is completed by drying the graphite-impregnated anode body at 80° - 100° C.

Thus the production of a conventional solid electrolyte capacitor of the described type needs a large number of steps for providing a cathode collector layer. Besides, the inherent surface ruggedness of the manganese dioxide layer necessitates the application of a costly silver paint in a considerably large quantity. Apart from the troubles at the formation of the contact and collector layers, the insufficient denseness and the rugged surface of the manganese dioxide layer cause that the capacitor suffers from a considerably large loss factor and unsatisfactory frequency and/or impedance characteristics.

As to the physical structure of the manganese dioxide layer formed by the pyrolysis of a manganese nitrate solution in the production of solid electrolyte capacitor, a remarkably improved method has recently been developed by A. Nishino et al of Matsushita Electric Industrial Co. and is disclosed in U.S. Patent application Ser. No. 632,079 filed Nov. 14, 1975, now U.S. Pat. No. 4,038,159. Among the coinventors of the present invention, A. Nishino and H. Hayakawa are included in the coinventors in the above referred prior application.

SUMMARY OF THE INVENTION

Briefly, the newly developed method is characterized by performing the pyrolysis in a semi-closed heating chamber of a radiant furnace so that the pyrolysis may proceed under a small magnitude of positive pressure which is solely attributable to a restriction to the outflow of the decomposition gas from the heating chamber. In comparison with this method, the pyrolysis in conventional methods is performed under the atmospheric pressure in either a hot-air circulation furnace or an electric furnace or, alternatively, in a pressurized steam atmosphere. A manganese dioxide layer formed by this new method consists of very fine, almost uniformly sized and densely accumulated particles and accordingly has a less rugged surface than the layers formed by conventional methods. In the new method, the manganese dioxide particle size can be regulated by controlling the conditions under which the anode body is wetted with a manganese nitrate solution and heated. When the particle size is regulated within a range from about 0.1 to about 50 $\mu$m, solid electrolyte capacitors of excellent characteristics can be obtained since the manganese dioxide layer almost idealy covers the dielectric oxide layer and has a good conductivity and healing or reforming ability. These capacitors are superior to conventional manganese dioxide capacitors particularly in the loss, leakage current, frequency-capacitance characteristic and impedance characteristic.

For the improved manganese dioxide layer formed by the pyrolysis in a semi-closed heating chamber, we have recognized a problem that the improved denseness and surface smoothness of this manganese dioxide layer is rather unfavorable to a strong adhesion of a colloidal graphite layer formed thereon. Although a fully practicable and remarkably improved manganese dioxide solid electrolyte capacitor can be obtained even when a graphite contact layer and a metallic collector layer are formed in conventional manners on the manganese dioxide layer formed by the improved pyrolysis method, the unsatisfactory intimateness and adhesion between the graphite layer and the manganese dioxide layer are considered to be hindering the capacitors from taking a full advantage of the improved manganese dioxide layer.

From the above described reasons, manganese dioxide solid electrolyte capacitors are in need of an improvement on the method of providing a cathode collector onto the solid electrolyte. Such improvement is particularly necessary to allow this type of solid electrolyte capacitor to have still widened uses in higher frequency regions.

It is an object of the present invention to provide an improved solid electrolyte capacitor, which utilizes manganese dioxide as the solid electrolyte and has a novel cathode collector layer featuring excellence both in physical intimateness with the solid electrolyte and in electrical characteristics and, besides, ease in production.

It is another object of the invention to provide a manganese dioxide solid electrolyte capacitor having a metallic cathode collector layer formed on the solid electrolyte layer without interposing any graphite contact layer therebetween.

It is still another object of the invention to provide a method of producing the improved manganese dioxide solid electrolyte capacitor.

A solid electrolyte capacitor according to the invention has an anode body of a valve metal and an anodized dielectric oxide film on the surface of the anode body as in conventional solid electrolyte capacitors. The solid electrolyte capacitor of the invention is characterized by comprising a manganese dioxide solid electrolyte layer which is formed on and in intimate contact with the dielectric oxide film by pyrolytic decomposition of an aqueous solution of manganese nitrate and is formed of densely accumulated manganese dioxide particles within the range of the particle size between about 0.1 and about 50 $\mu$m and a cathode collector layer formed by spraying of a metal powder on and in intimate contact with the manganese dioxide layer.

Metals useful as the material of the cathode collector layer are copper, tin, lead, nickel, silver and aluminum, including alloys thereof, and the cathode collector layer is preferably about 5 – 60 $\mu$m in thickness.

It is preferable that the solid electrolyte layer is entirely formed of the above described manganese dioxide particles. However it is permissible that only a surface region of the solid electrolyte layer is formed of such particles while the remaining region is formed of more coarse manganese dioxide particles.

A method of producing the solid electrolyte capacitor according to the invention comprises the following steps:

(a) anodizing the surface of a valve metal anode body in a known manner to form a dielectric oxide film;

(b) wetting the dielectric oxide film with an aqueous solution of manganese nitrate;

(c) heating the wet anode body to cause pyrolytic decomposition of manganese nitrate to manganese dioxide in a heating chamber of a radiant furnace thereby to form a solid electrolyte layer on the dielectric oxide film, which heating chamber is semi-closed and in communication with the atmosphere exclusively through at least one vent formed in the wall of the heating chamber with such a total vent area that the pyrolytic decomposition proceeds under a positive pressure of a small magnitude attributable only to a natural restriction by the vent to the outflow from the heating chamber of gaseous substances generated from the solution during the pyrolysis; and (d) spraying a metal powder, preferably by a plasma spraying technique, onto the surface of the solid electrolyte layer to form a metallic cathode collector layer.

The sequential steps (b) and (c) may be repeated several times to attain desirable denseness and thickness of the manganese dioxide electrolyte layer. It is permissible that the sequential steps (b) and (c) are preceded by at least one cycle of conventional pyrolysis procedure wherein the anode body, which is wetted with a manganese nitrate solution, is heated in a heating chamber other than the semi-closed chamber, for example a heating chamber of a hot-air circulating type, on condition that the formation of the solid electrolyte layer is ended by the above defined step (c).

BRIEF DESCRIPTION OF THE DRAWINGS

The invention will fully be understood from the following detailed description of preferred embodiments with reference to the accompanying drawings, wherein.

DESCRIPTION OF THE PREFERRED EMBODIMENTS

Figure 1:
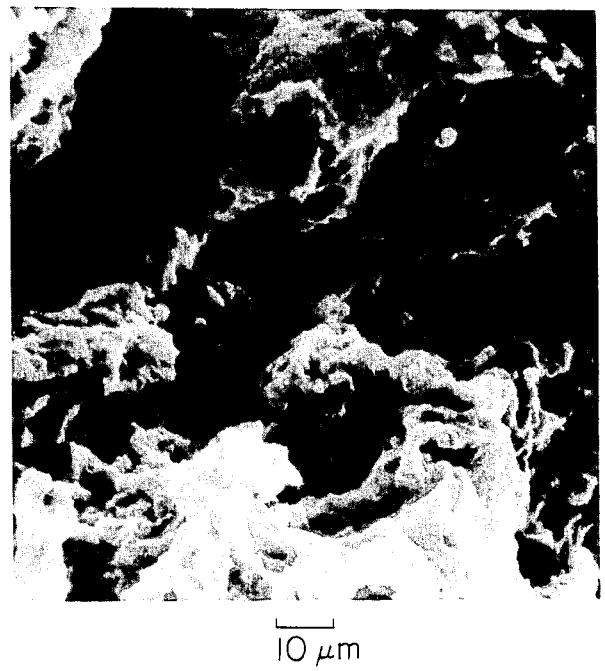
FIG. 1 is a microphotograph taken with a scanning electron microscope of a manganese dioxide layer formed by a conventional pyrolysis method.

A solid electrolyte layer which consists of densely accumulated fine particles of manganese dioxide particles within a particle size range of about 0.1 – 50 $\mu$m can be formed on an anodized valve metal anode only when, so long as the pyrolysis of manganese nitrate in the form a solution is employed as the forming technique, the pyrolysis is performed by the above described improved method using a semi-closed radiant furance. Such a superior manganese dioxide layer cannot be formed by performing the pyrolysis either in a hot-air stream or in a steam atmosphere. A 1000 magnification microphotograph of FIG. 1 taken with a SEM shows a typical example of manganese dioxide layers formed by performing the pyrolysis in a conventional furnace of a hot-air circulating type. In this microphotograph, the manganese dioxide layer is formed of considerably large-sized and irregularly accumulated particles, and has an extremely rugged and interstitial surface appearing like corollas.

Figure 2:
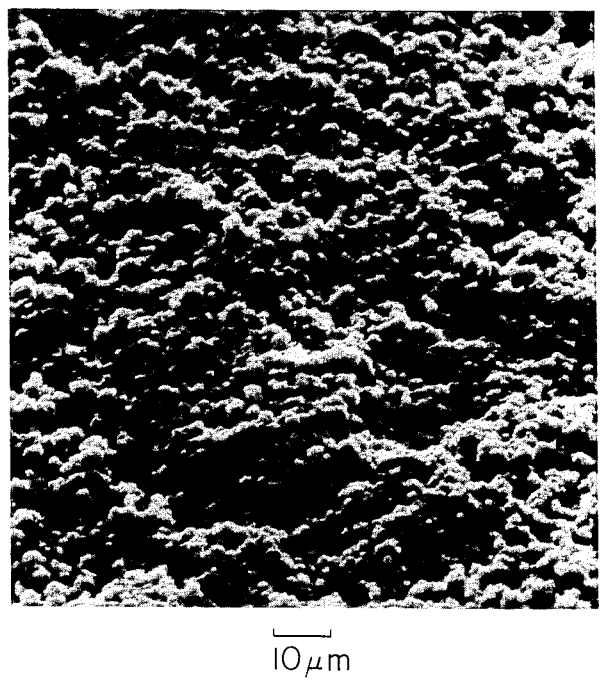
FIG. 2 is a similar microphotograph of a manganese dioxide layer formed by an improved pyrolysis method using a semi-closed heating chamber.

In contrast, a 1000 magnification microphotograph of FIG. 2 shows an example of manganese dioxide layers formed by performing the pyrolysis in a semi-closed heating chamber without externally introducing any heated fluid into the chamber, so that the pyrolysis proceeds under a positive pressure of a small magnitude created by nitrogen oxides gas and some steam generated upon pyrolysis of a manganese nitrate solution. In FIG. 2, the manganese dioxide layer consists of very fine and densely accumulated particles, the particle size of which is almost uniform and within the range between about 1 and about 4 $\mu$m. The surface of this layer may be regarded as almost smooth in comparison with FIG. 1.

Figure 3:
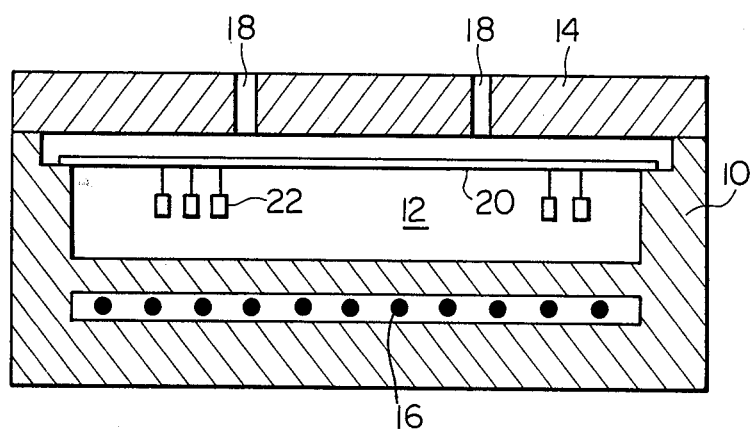
FIG. 3 is a schematic and sectional view of a semi-closed radiant furnace employed in the invention for performing the pyrolysis to form a manganese dioxide electrolyte layer.

FIG. 3 shows the fundamental construction of a radiant furnace having a semi-closed heating chamber for performing the improved pyrolysis. A body 10 of this furnace is made of a material which has a good heat conductivity at least at elevated temperatures. A heating chamber 12 is formed in the body 10 covered with a lid member 14. The furnace has heater elements 16 isolated from the heating chamber 12. A vent 18 (illustrated as two apertures but may be either a single larger aperture or a larger number of smaller apertures) is formed in the lid member 14 so that the heating chamber 12 may communicate with the atmosphere exclusively through this vent 18 during a heating operation. A holder 20 is installed in the heating chamber to hold anode bodies 22, which are wetted with a manganese nitrate solution, spaced from the furnace body 10 and the lid member 14. The total cross-sectional area of the vent 18 is appropriately determined relatively to the volume of the heating chamber 12 and the quantity of the decomposition gas generated at the pyrolysis in order to offer a substantial resistance to the outflow of the decomposition gas from the heating chamber 12 and realize the intended positive pressure during the pyrolysis. As disclosed in the above referred prior application, the ratio of the volume of the chamber 12 to the total area of the vent 18 is 50 – 2000 cm$^3$/cm$^2$, and the ratio of the volume of the decomposition gas to the vent area is made to be 100–10,000 ml/cm$^2$. Then the chamber pressure during the pyrolysis varies in accordance with the proceeding of the pyrolysis up to 5 – 100 mmH$_2$O in gage pressure.

The pyrolysis in the semi-closed heating chamber 12 is performed at a temperature between about 130° and about 350° C as in the conventional pyrolysis methods. The anode body 22 is wetted with an aqueous solution of manganese nitrate usually by an immersion method in the same manner as in the conventional pyrolysis methods. However, it is possible to use a highly concentrated manganese nitrate solution, even a more than 80% solution, with the result that the formation of the manganese dioxide layer can be accomplished through lessened repetition of the immersion and heating steps not accompanied by a lowering in the quantity of the formed layer.

Figure 4:
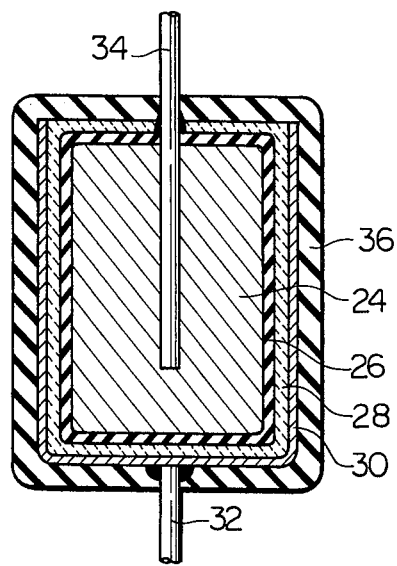
FIG. 4 is a sectional view of a solid electrolyte capacitor according to the invention.

FIG. 4 shows a solid electrolyte capacitor as an embodiment of the invention. Reference numeral 24 indicates an anode body which is a porous mass produced by pressing and sintering a valve metal, usually aluminum or tantalum, powder. The surface of the anode body 24 is anodized to form a dielectric oxide film 26, and a solid electrolyte layer 28 consisting of densely accumulated manganese dioxide particles within the range of 0.1 – 50 μm in particle size intimately covers the dielectric oxide film 26. A metallic cathode collector layer 30 is formed on and in intimate contact with a major portion of the surface of the solid eletrolyte layer 28. As described hereinbefore, the cathode collector layer 30 is formed by a metal spraying technique.

Both plasma spraying and flame spraying techniques are useful in the formation of this layer 30, but plasma spraying is preferred in view of the characteristics of the produced capacitor. Among the metals hereinbefore enumerated as the material of the collector layer 30, copper, tin and aluminum, including their alloys, are most preferable from the viewpoints of cost and adaptability to plasma spraying. Preferably, the collector layer 30 is made to have a thickness in the range from about 5 to about 60 μm. It is difficult to intimately and uniformly cover the solid electrolyte layer 28 if the collector layer 30 is less than about 5 μm thick. However, the collector layer 30 is liable to separate from the solid electrolyte layer 28 when formed too thick, i.e., to more than about 60 μm thick. Besides, it is undesirable that the solid electrolyte layer 28 is subjected to a high temperature at the spraying for an unnecessarily large amount of time. The preferable upper limit of the thickness of the collector layer 30 is determined for this reason, too.

A cathode lead 32 is attached to the collector layer 30 while an anode lead 34 is attached to the anode body 24. The thus constructed solid electrolyte capacitor is encased in a case 36.

Excellent characteristics of the solid electrolyte capacitor having the above described manganese dioxide layer 28 and the cathode collector layer 30 will be illustrated by the following examples.

EXAMPLE 1

The anode body 24 was produced by sintering tantalum powder to a mass of 100 mg. The dielectric oxide film 26 was formed by a usual anodizing technique using a phosphoric acid solution. The anodizing potential was brought to 30 V over a period of 2 hr at room temperature. A plurality of the thus anodized tantalum bodies 24 were divided into three groups, A, B and C.

For the group A, a manganese dioxide layer was formed by a conventional pyrolysis method. The anodized tantalum bodies 24 of the group A were immersed in an aqueous solution of manganese nitrate and then heated at 250° C in a hot-air circulation furnace to cause the pyrolysis of manganese nitrate. The immersion and the heating steps were repeated 9 times by the use of three differently concentrated manganese nitrate solutions, i.e., 25%, 35% and 45% (by weight) solutions, wherein the solutions of relatively high concentrations were used at later stages of the repetition.

For the group B, the manganese dioxide layer 28 of FIG. 4 was formed by repeating 4 times the sequential steps of immersing the anodized tantalum bodies 24 in a 60 Wt% aqueous solution of manganese nitrate and performing the pyrolysis at 250° C in a semi-closed radiant furnace constructed as shown in FIG. 3. The ratio of the volume of the heating chamber 12 to the total area of the vent 18 was 500 cm$^3$/cm$^2$ and the ratio of the volume of the decomposition gas to the vent area was about 2000 ml/cm$^3$. The particle size in the resultant manganese dioxide layer 28 was about 1 – 4 μm.

The anodized tantalum bodies 24 of the group C were firstly subjected to the immersion and pyrolysis steps employed for the group A except that the number of the repetition was lessened to five times. Thereafter, the immersion of the 60% manganese nitrate solution and the pyrolysis in the semi-closed radiant furnace as described for the group B were once performed on the samples of the group C.

The cathode collector layer 30 was formed for every sample of the groups A, B and C on the respective manganese dioxide layers by the plasma spraying of copper powder using argon gas. Then the samples were worked to construct the capacitors as shown in FIG. 4.

Figure 5:
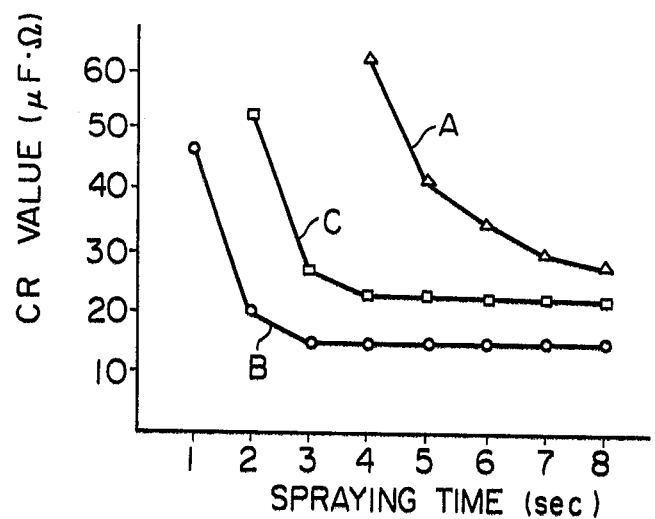
FIG. 5 is a graph showing the influence of a plasma spraying time for forming the cathode collector layer in solid electrolyte capacitors constructed as shown in FIG. 4 on the CR value of the capacitor.

For these three groups A, B and C, the minimum time required for forming the cathode collector layer 30 of an acceptable quality by the plasma spraying was different from group to group. The quality of the collector layer 30 was examined by measuring the CR value of the completed capacitors at 120 Hz, and the experimental results are shown in FIG. 5. For the group A, it was impossible to obtain a practicable capacitor when the plasma spraying was carried out for less than 4 sec, because the surface of the manganese dioxide layer formed by the conventional pyrolysis method was extremely rugged and could not easily be covered with the sprayed copper. The CR value for the group A remained above 25 $\mu$F.$\Omega$ even when the spraying time was prolonged to 7 - 8 sec. As the spraying time was prolonged, the production of the capacitor suffered an increase in the number of unacceptable products, and the produced capacitors exhibited an increase in the leakage current. Besides, the surface ruggedness of the manganese dioxide layer was still enhanced by the extension of the spraying time. To summarize, the formation of the metallic collector layer 30 directly on the manganese dioxide layers of the group A samples had practically no advantage over the conventional technique in which colloidal graphite and silver paint are applied in two stages.

For the group B, it was possible to form a highly efficient collector layer 30 on the fine-particle manganese dioxide layer 28 by performing the spraying only for 2 - 3 sec. The completed capacitors of this group were superior to conventional manganese dioxide electrolyte capacitors in the CR value.

It was necessary for the group C to slightly prolong the spraying time for forming a good collector layer 30 on the manganese dioxide layer 28, which consisted of a coarse inner region and a fine outer region, and nevertheless the ultimate CR value of the group C capacitors was somewhat larger than that of the group B capacitors. However, both the ease in forming the collector layer 30 and the ability of the formed collector layer 30 for the group C were far better than those for the group A and almost comparable to those for the group B.

EXAMPLE 2

The tantalum anode body 24 of Example 1 was anodized according to Example 1 to form the dielectric oxide film 26. The manganese dioxide layer 28 was formed in a semi-closed heating chamber by a pyrolysis procedure fundamentally similar to the procedure employed for the group B in Example 1. However, the factors of the pyrolysis including the particulars of the semi-closed heating chamber were variously modified such that the particle size in the manganese dioxide layer 28 was in one of the following five different ranges: about 0.1 - 0.5 $\mu$m, about 1 - 4 $\mu$m, about 8 - 12 $\mu$m, about 30 - 40 $\mu$m, and about 70 - 100 $\mu$m. As exemplified by the microphotograph of FIG. 2, it is difficult to form the manganese dioxide layer 28 as an accumulation of variously and greatly differently sized particles, for example, as includes both 5 $\mu$m particles and 50 $\mu$m particles by the improved pyrolysis method using a semi-closed heating chamber. Furthermore, a greatly wide distribution of the particle size in the manganese dioxide layer 28 causes the layer 30 to have a noticeably rugged surface and hence is undesirable.

Figure 6:
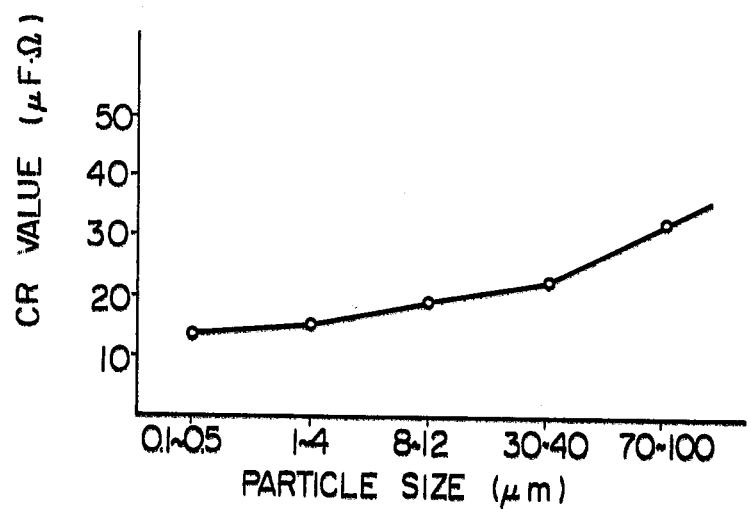
FIG. 6 is a graph showing the relationship between the manganese dioxide particle size in the solid electrolyte layer and the CR value for the capacitor of FIG. 4.

The cathode collector layer 30 was formed according to Example 1 by the employment of a fixed spraying time of 5 sec regardless of the particle size distribution in the manganese dioxide layer 28. The graph of FIG. 6 shows the relationship between the particle size of the manganese dioxide layer 28 and the CR value of the completed capacitors. As seen in this graph, it is desired that the manganese dioxide particle size be very small from the viewpoint of the quality of the obtained capacitor. However, it is very difficult and uneconomical to make the particle size smaller than about 0.1 $\mu$m. Considering both the surface ruggedness of the manganese dioxide layer 28 and the loss of the produced capacitor, the particle size should not be made larger than about 50 $\mu$m. Based on these experimental results and considerations, the manganese dioxide particle size in the present invention is made to be within the range from about 0.1 to about 50 $\mu$m. A narrower range of about 0.5 - 20 $\mu$m is more preferable for accomplishing improvements on the characteristics of the capacitor, minimizing the number of unacceptable products and lowering the overall cost of the production.

EXAMPLE 3

Example 1 was repeated until the formation of the three different types of manganese dioxide layers. For the group A (the coarse manganese dioxide layer formed by the conventional pyrolysis method), the collector layer 30 was formed according to Example 1 by performing the plasma spraying for 8 sec. The same plasma spraying was performed for 5 sec on the samples of group B (the fine mangenese dioxide layer by the improved pyrolysis method) and group C (the combined use of both methods).

Figure 7:
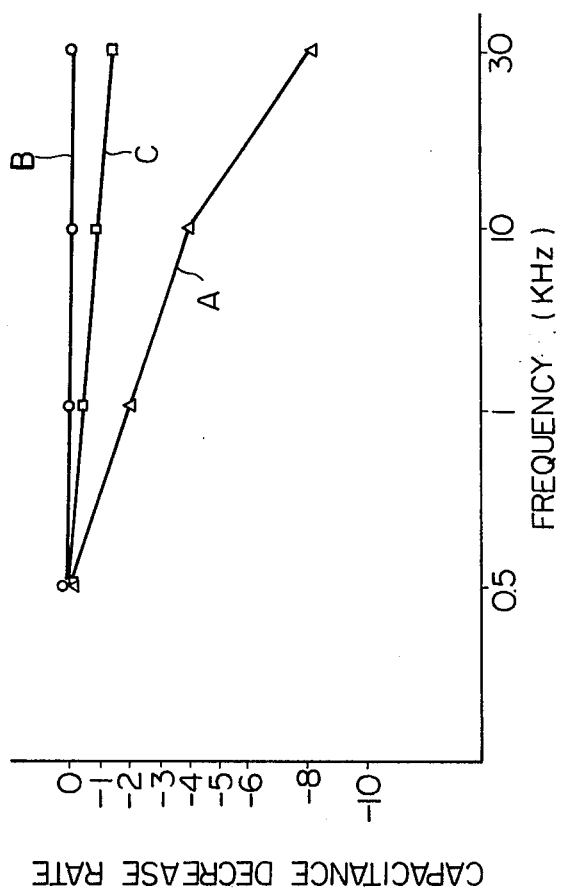
FIG. 7 is a graph showing the frequency-capacitance characteristic of the solid electrolyte capacitors according to the invention in comparison with that of a capacitor which is similar in construction but has a differently formed manganese dioxide layer.

On the three groups (A, B and C) of capacitors produced in this example, the rate of decrease in the capacitance at high frequencies was examined on the basis of the values at 500 Hz, and the result is shown in FIG. 7. The group B capacitors exhibited a remarkably improved frequency-capacitance characteristic while the group A capacitors were substantially unchanged in this respect from conventional manganese dioxide electrolyte capacitors. The characteristic of the group C capacitors (in which only a surface region of the manganese dioxide layer was formed by the improved method) was almost comparable with that of the group B capacitors.

The thus verified excellence of a solid electrolyte capacitor according to the invention, particularly in its impedance and frequency characteristics, is primarily attributable to the fine, dense and almost smooth surfaced manganese dioxide layer 28. However, the spray-formed collector layer 30 as the replacement for the conventional graphite layer and the wet-formed collector layer makes a great contribution to practically make manifest the superiority of the improved manganese dioxide layer 28 by intimately and firmly covering the manganese dioxide layer 28. The combination of the manganese dioxide layer 28 consisting of about 0.1 - 50 $\mu$m particles and the spray-formed metallic collector layer 30 is the essential point of the invention. As illustrated by Examples 1 and 3, the combination of a coarse manganese dioxide layer formed by a conventional pyrolysis method and the metallic collector layer 30 according to the invention is not advantageous. To make this combination practicable, a colloidal graphite layer should be formed on the rugged surface of the manganese dioxide layer in preparation for the formation of the collector layer 30. There is no need of forming a colloidal graphite layer on the improved manganese dioxide layer 28 when the collector layer 30 according to the invention is employed. When the capacitor according to the invention has a colloidal graphite layer very carefully formed on the manganese dioxide layer 28 as an undercoat of the collector layer 30, the capacitor still exhibits its excellent characteristics at room temperature but is unfavorably influenced by the addition of the colloidal graphite layer at temperatures above about 80° C. Furthermore, the addition of a colloidal graphite layer negates one of the features of the capacitor according to the invention, that is, the ease in and low cost of the production.

What is claimed is:

1. A solid electrolyte capacitor comprising:
an anode body of a valve metal;
a dielectric oxide layer anodically formed on the surface of said anode body;
a solid electrolyte layer of manganese dioxide on said dielectric oxide layer formed by pyrolytic decomposition of an aqueous solution of manganese nitrate applied to the surface of said dielectric oxide layer, at least an outmost portion of said solid electrolyte layer consisting of densely accumulated manganese dioxide particles of about 0.1 to about 50 μm in particle size formed by performing said pyrolytic decomposition in a semi-closed heating chamber of a radiant furnace, said heating chamber being in communication with the atmosphere exclusively through at least one vent which is formed in the wall of said heating chamber and has a predetermined total area such that said pyrolytic decomposition proceeds under a positive pressure of a small magnitude solely attributable to a resistance offered by said at least one vent to the outflow from said heating chamber of gaseous substances generated upon said pyrolytic decomposition; and
a cathode collector layer formed by plasma spraying of a metal powder on and in intimate contact with said solid electrolyte layer.

2. A solid electrolyte capacitor as claimed in claim 1, wherein the particle size of said manganese dioxide particles is between about 0.5 and about 20 μm.

3. A solid electrolyte capacitor as claimed in claim 1, wherein said metal powder is of a metal selected from the group consisting of copper, tin, aluminum, nickel, lead and silver, including their alloys.

4. A solid electrolyte capacitor as claimed in claim 3, wherein said cathode collector layer has a thickness between about 5 and about 60 μm.

5. A solid electrolyte capacitor as claimed in claim 3, wherein said metal powder is copper powder.

6. A solid electrolyte capacitor as claimed in claim 3, wherein said valve metal is tantalum.

7. A solid electrolyte capacitor as claimed in claim 3, wherein said predetermined total area is such that the ratio of the volume of said heating chamber to said total area is in the range from about 50 to about 2000 cm$^3$/cm$^2$, while the ratio of the quantity of said gaseous substances to said total area is in the range from about 100 to 10000 ml/cm$^2$.

8. A solid electrolyte capacitor as claimed in claim 7, wherein an inner portion of said solid electrolyte layer is at least partially formed by performing said pyrolytic decomposition in a heating chamber which allows substantially free outflow therefrom of said gaseous substances.

9. A solid electrolyte capacitor as claimed in claim 7, wherein said solid electrolyte layer entirely consists of said manganese dioxide particles.

10. A method of producing a solid electrolyte capacitor, comprising the step of:
(a) anodizing an anode body of a valve metal to form thereon a dielectric oxide layer;
(b) wetting the anodized anode body with an aqueous solution of manganese nitrate;
(c) heating the wetted anode body to cause pyrolytic decomposition of manganese nitrate to manganese dioxide and form a manganese dioxide solid electrolyte layer consisting of manganese dioxide particles of about 0.1 to 50 μm in particle size on said dielectric oxide layer in a semi-closed heating chamber of a radiant furnace, said heating chamber being in communication with the atmosphere exclusively through at least one vent which is formed in the wall of said heating chamber and has a predetermined total area such that said pyrolytic decomposition proceeds under a positive pressure of a small magnitude solely attributable to a resistance offered by said at least one vent to the outflow from said heating chamber of gaseous substances generated upon said pyrolytic decomposition; and
(d) spraying a metal powder onto the surface of said solid electrolyte layer to form a cathode collector layer thereon.

11. A method as claimed in claim 10, wherein said predetermined total area is such that the ratio of the volume of said heating chamber to said total area is in the range from about 50 to about 2000 cm$^3$/cm$^2$, while the ratio of the quantity of said gaseous substances to said total area is in the range from about 100 to 10000 ml/cm$^2$.

12. A method as claimed in claim 10, further comprising the steps of: (e) wetting the anodized anode body with an aqueous solution of manganese nitrate; and (f) heating the wetted anode body to cause pyrolytic decomposition of manganese nitrate to manganese dioxide and form a manganese dioxide layer on said dielectric oxide layer in a heating chamber which allows substantially free outflow therefrom of gaseous substances generated upon said pyrolytic decomposition; the steps (e) and (f) being carried out only between the steps (a) and (b).

13. A method as claimed in claim 10, wherein said metal powder is of a metal selected from the group consisting of copper, tin, aluminum, nickel, lead and silver, including their alloys.

14. A method as claimed in claim 13, wherein the steps (b) and (c) are repeated at least two times.

15. A method as claimed in claim 13, wherein the step (d) is carried out by plasma spraying.

16. A method as claimed in claim 15, wherein said metal powder is copper powder.

* * * * *